(12) United States Patent
Yasuda et al.

(10) Patent No.: US 7,025,704 B2
(45) Date of Patent: Apr. 11, 2006

(54) PLANETARY GEAR FOR AUTOMATIC TRANSMISSION

(75) Inventors: Takashi Yasuda, Anjo (JP); Akihiko Kita, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 62 days.

(21) Appl. No.: 10/712,253

(22) Filed: Nov. 14, 2003

(65) Prior Publication Data

US 2004/0147361 A1 Jul. 29, 2004

(30) Foreign Application Priority Data

Dec. 27, 2002 (JP) .............................. 2002-382551

(51) Int. Cl.
*F16H 3/44* (2006.01)
*F16H 57/04* (2006.01)
*F16H 37/02* (2006.01)

(52) U.S. Cl. ....................... 475/323; 475/159; 475/210
(58) Field of Classification Search ................ 475/323, 475/210, 159, 326–8, 331
See application file for complete search history.

(56) References Cited

U.S. PATENT DOCUMENTS

| 2,544,543 | A | * | 3/1951 | Porter ......................... 475/326 |
| 4,380,179 | A | * | 4/1983 | Kubo et al. ................. 475/159 |
| 5,052,991 | A | * | 10/1991 | Yamaguchi et al. ........ 475/344 |
| 5,480,361 | A | * | 1/1996 | Murakami et al. .......... 475/328 |
| 5,607,371 | A | * | 3/1997 | Yamaguchi .................. 475/210 |
| 6,059,682 | A | * | 5/2000 | Friedmann et al. ......... 475/159 |
| 6,488,137 | B1 | * | 12/2002 | Katou et al. ............. 192/70.12 |
| 6,702,711 | B1 | * | 3/2004 | Zelikov et al. ............. 475/331 |
| 6,824,494 | B1 | * | 11/2004 | Yasuda et al. ............... 475/321 |

FOREIGN PATENT DOCUMENTS

JP 6-221384 8/1994

* cited by examiner

*Primary Examiner*—Roger Pang
(74) *Attorney, Agent, or Firm*—Bacon & Thomas, PLLC (57) ABSTRACT

In a planetary gear unit for an automatic transmission, notches that are longer than the diameter of a pinion are formed in a brake hub that is integral with a carrier cover. Lubricating oil holes are formed in the carrier cover so as to extend from the inner cylindrical surface thereof to the respective notches. The pinion is inserted through one of these notches for mounting between the carrier cover and the carrier body integrated therewith. Oil flowing from the lubricating oil holes lubricates pinion support surfaces and the like and is then supplied through the notches to a reverse brake.

21 Claims, 4 Drawing Sheets

PLANETARY GEAR FOR AUTOMATIC TRANSMISSION

INCORPORATION BY REFERENCE

The disclosure of Japanese Patent Application No. 2002-382551 filed on Dec. 27, 2002, including the specification, drawings and abstract is incorporated herein by reference in its entirety.

CROSS-REFERENCE TO RELATED APPLICATION

This application claims, under 35 USC 119, priority of Japanese Application No. 2002-382551 filed Dec. 27, 2002.

BACKGROUND OF THE INVENTION

1. Field of the Invention

The present invention relates to an automatic transmission and, more particularly, to a planetary gear unit that is suitable for use as a forward-reverse switching mechanism of a continuously variable automatic transmission. More specifically, the present invention relates to the structure of a carrier of a planetary gear unit in which a hub for a frictional engagement element such as a brake or the like is integrated with the carrier.

2. Description of the Related Art

In general, a belt-type continuously variable automatic transmission includes a belt-type continuously variable speed-change unit and a forward-reverse switching mechanism. The forward-reverse switching mechanism may employ either a planetary gear unit having a single pinion carrier (hereinafter referred to as a simple planetary gear unit) or a planetary gear unit having a dual pinion carrier (hereinafter referred to as a dual planetary gear unit). The forward-reverse switching mechanism employing a simple planetary gear unit has a ring gear coupled to an input shaft, a sun gear coupled to a primary pulley, a forward clutch interposed between the ring gear and the sun gear, and a carrier selectively stopped by a reverse brake.

Heretofore, a forward-reverse switching mechanism of the above-described type has had a construction wherein which a rear lateral plate of a carrier (a carrier cover) is extended axially forward on a radially outward side of the planetary gearing, a drum-type cylindrical member is extended to surround the outer periphery of a forward clutch, and a plurality of friction plates are alternately disposed between the cylindrical member and the case so as to form a reverse brake (e.g., see Japanese Patent Laid-Open Publication No. 06-221384). It should be noted herein that the "front side" (engine side) of an automatic transmission is connected to an engine and the "rear side" of the automatic transmission is the side opposite the "front side."

Since the forward clutch and the reverse brake axially overlap with each other, the aforementioned forward-reverse switching mechanism can be reduced in its axial dimension but is correspondingly bulky in its radial dimension. In addition, one lateral plate (a carrier cover) having the cylindrical member constituting a brake hub and the other lateral plate (a carrier body) that is annular in shape are integrated by a bridge, to form the aforementioned carrier. In mounting a pinion on the carrier, the pinion is installed between the lateral plates by passing the pinion through a space between the cylindrical member and the annular plate, a troublesome and difficult operation. Further, a space is required to allow the pinion to be passed between the cylindrical member and the annular plate, which also leads to an increase in radial dimension.

During forward movement of the vehicle, the forward clutch is engaged and the planetary gear unit rotates integrally. Therefore, the aforementioned forward-reverse switching mechanism does not require a large amount of lubricating oil. On the other hand, during a reverse movement of the vehicle, the forward clutch is released and the reverse brake is engaged so that the carrier is stopped, and rotation of the ring gear transmitted from the input shaft is transmitted to the sun gear via the pinion as decelerated and reversed rotation. Therefore, the forward-reverse switching mechanism requires a larger amount of lubricating oil during reverse movement of the vehicle than during forward movement. Because the forward-reverse switching mechanism is constructed as a cylindrical member, a lubricating oil passage cannot be formed in one lateral plate. Lubricating oil is intended to flow from a radially extending oil hole formed in the sun gear due to centrifugal force and to thereby lubricate the pinion and the like but, instead, the lubricating oil exiting the oil hole is first scattered about in the space and then supplied to a gear meshing face. Therefore, the meshing face or the like may not be supplied with a sufficient amount of lubricating oil.

Lubricating oil urged by centrifugal force is supplied to the forward clutch and the reverse brake. For this reason, a plurality of through-holes need to be formed in the clutch drum and in the aforementioned cylindrical member serving as a brake hub. This leads to an increase in manufacturing cost.

SUMMARY OF THE INVENTION

It is therefore an object of the present invention to provide a planetary gear unit for an automatic transmission which solves the problems described above by forming notches in a hub of a frictional engagement element (e.g., a brake hub) so that pinions can be introduced through the notches in assembly and so that lubricating oil can be supplied from the notches to a reverse brake.

According to a first aspect of the present invention, notches of a circumferential length equal to or greater than the diameter of a pinion are formed in a hub. In assembling, the pinions can be inserted from the notches and supported between the two lateral plates constituting the carrier. Further, lubricating oil can be supplied from the radially inward side of the hub to a frictional engagement element through the notches. Thus, there is no need to form a dedicated hole in the hub for supplying lubricating oil, and the overall manufacturing process is thereby simplified. As a result, reductions in cost can be achieved.

According to a second aspect of the present invention, a lubricating oil hole may be formed in the one lateral plate of the carrier. In this case, lubricating oil can be reliably supplied to a lubrication-requiring portion of the pinion and the like through the lubricating oil hole. The lubricating oil hole may be radially aligned with a notch in the hub. The lubricating oil, after lubricating the pinion and the like, is efficiently supplied to the frictional engagement element through the notches in the carrier. A lubricating oil hole is easily formed, for example, by drilling a hole from within a notch in the outer peripheral face of the one lateral plate. Also, a stopper for the lubricating oil hole can be installed.

According to a third aspect of the present invention, the segments of the outer peripheral face of the one lateral plate between the notches may be formed as a smooth surface. In this case, there is no need to form a spot facing for drilling or the like. Therefore, the man-hours required for machining are reduced, whereby a further reduction in cost can be achieved.

According to a fourth aspect of the present invention, lubricating oil supplied from the radially inward side may be reliably fed to a support surface of the pinion through the lubricating oil hole formed in the one lateral plate, a through-hole formed in a pinion support shaft (fixed by a pin) in communication with the lubricating oil hole, and longitudinal and lateral oil holes formed in the support shaft. With this design, even if the components of the planetary gear unit rotate relative to one another at a high speed, a sufficient amount of lubricating oil, can be supplied to those portions requiring lubrication, such as the support surface of the pinion, a meshing face of the pinion, and the like.

According to a fifth aspect of the present invention, the pin is inserted from the radially outer end of the lubricating oil hole as to extend entirely through the through-hole. In this manner, the support shaft is fixed to the one lateral plate against rotation and axial movement relative thereto, so as to reliably support the pinion. The radially outer end of the lubricating oil hole may be plugged, so that oil flowing from the lubricating oil hole is reliably supplied to the support surface of the pinion. In this case, the single pinion provides both the fixing and plugging functions as mentioned above. Therefore, the number of parts and the man-hours required for assembly can be reduced.

According to a sixth aspect of the present invention, even where no centrifugal force is applied to the oil in the lubricating oil hole formed in the one lateral plate, after the carrier integrated with the hub has been stopped by a frictional engagement element such as a brake or the like, the sun gear may be in rotation. In this case, lubricating oil from an oil sump on the radially inward side is reliably supplied to the portions requiring lubrication through the lubricating oil hole, by hydraulic pressure resulting from the centrifugal force generated by the rotation of the sun gear.

According to a seventh aspect of the present invention, in a forward-reverse switching unit, especially during reverse movement of the vehicle, the carrier may be stopped by a reverse brake, and rotation of a ring gear transmitted from an input shaft may be transmitted to the sun gear via the pinion of the stopped carrier. In this case, although the support and meshing faces of the pinion require a relatively large amount of lubricating oil because the pinion revolves at a relatively high speed, no centrifugal force is generated by the stopped carrier. However, a sufficient flow of lubricating oil is obtained due to centrifugal force generated by rotation of the sun gear and can be reliably supplied to those portions requiring lubrication, such as the support surface of the pinion and the like, through the lubricating oil hole, which is a closed space formed in the one lateral plate.

According to an eighth aspect of the present invention, the forward clutch and the reverse brake radially overlap with each other. In conjunction with the substantial reduction in required space by provision for insertion of the pinion through the notch, this construction makes the forward-reverse switching mechanism more compact, more specifically, more radially compact.

In the present specification, the term "overlap" refers to a state where two components actually overlap with each other when viewed from a certain direction. Thus, "axial overlap" refers to a state where two components axially overlap with each other when viewed from a radial direction. For example, a surface located at either end of a pinion and extending perpendicular to the axis thereof and a surface located at either end of a hub for a frictional engagement element and extending perpendicular to the axis thereof overlap with each other. In addition, "overlap" is not limited to a design wherein one of the surfaces extends completely across the other (parallel) surface. Obviously, the concept of "overlap" refers to a state where certain parts of the two planes appear to be on top of each other (i.e., the two planes are at least partially on top of each other) when viewed from a certain direction. This also holds true for the eighth aspect of the present invention. The concept of "radial overlap" refers to a state where at least portions of two components appear to be on top of each other when viewed from an axial direction. This holds true for all the embodiments described in the present specification.

DESCRIPTION OF THE PREFERRED EMBODIMENTS

As used herein, the engine side is referred to as the "front side" (right side in FIG. 1 and left side in FIG. 2) and that the other side is referred to as the "rear side".

Figure 1:
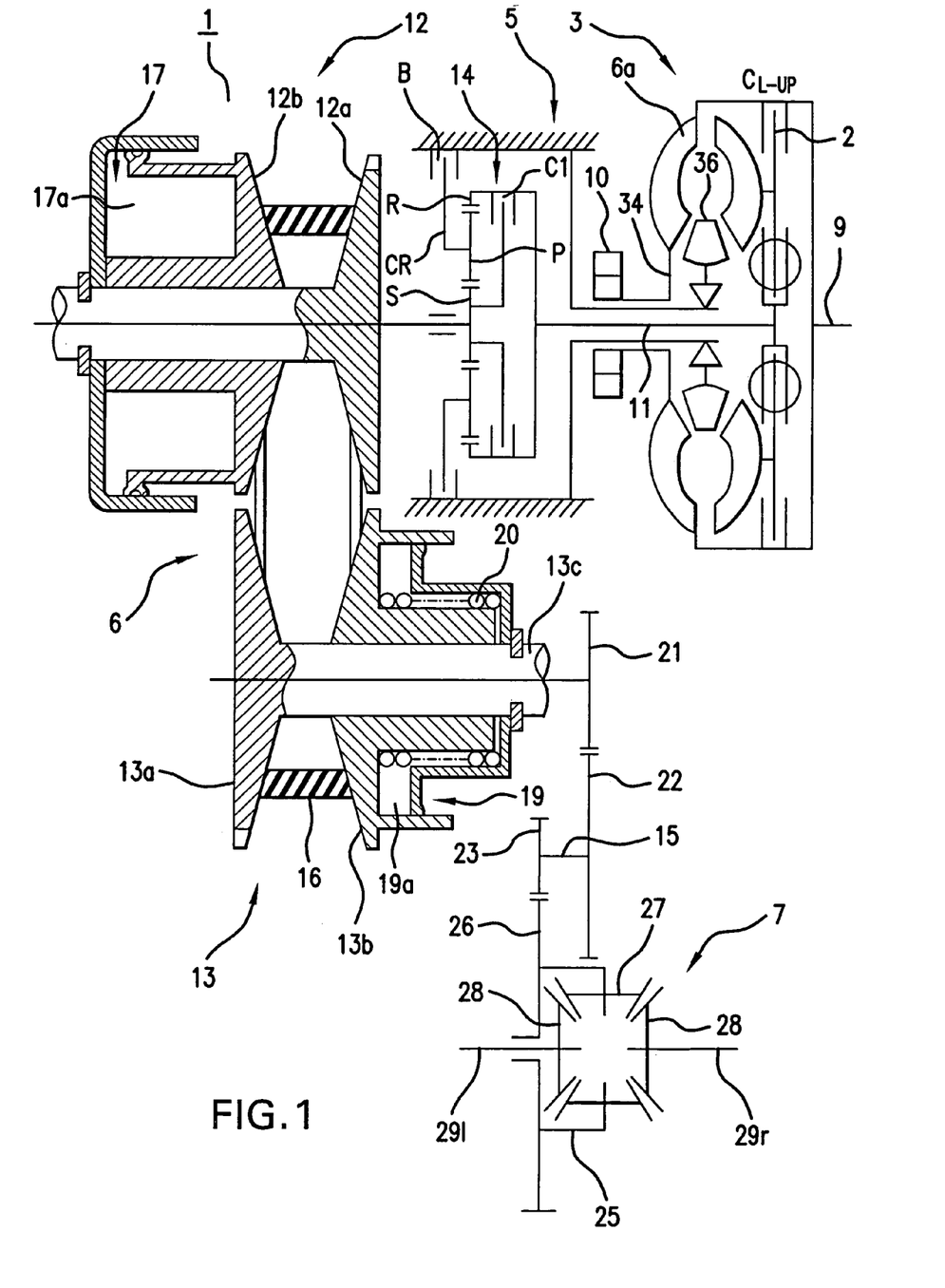
FIG. 1 is a schematic illustration of a continuously variable automatic transmission to which the present invention can be applied.

An embodiment in which the present invention is applied to a vehicular continuously variable automatic transmission will be described with reference to the drawings. As shown in FIG. 1, a continuously variable automatic transmission 1 includes a torque converter 3 having a lock-up clutch 2, a forward-reverse switching mechanism 5, a belt-type continuously variable speed-change unit 6, and a differential unit 7. An oil pump 10, an input shaft 11, the forward-reverse switching mechanism 5, and a primary pulley 12 of the belt-type continuously variable speed-change unit 6 are disposed on a first shaft that is coaxially aligned with a drive source such as an engine output shaft 9 or the like. A secondary pulley 13 is disposed on a second shaft. A countershaft 15 constitutes a third shaft. The differential unit 7 is disposed on a fourth shaft. These components are accommodated in an integral-type case (not shown).

The forward-reverse switching mechanism 5 includes a simple planetary gear unit 14 composed of a sun gear S, a ring gear R, and a carrier CR that supports a single pinion P meshing with the sun gear S and the ring gear R. The ring gear R is coupled to the input shaft 11. The sun gear S is coupled to the primary pulley 12. A forward clutch C1 is interposed between the ring gear R and the sun gear S. The forward clutch C1 is disposed such that a reverse brake B1 applies a braking force to the carrier CR.

The belt-type continuously variable speed-change unit 6 includes the primary pulley 12, composed of a stationary sheave 12a and a movable sheave 12b, the secondary pulley 13, composed of a stationary sheave 13a and a movable sheave 13b, and a metal belt 16 wound around the primary pulley 13 and the secondary pulley 13. A hydraulic actuator 17 having a hydraulic chamber 17a is disposed on the rear side face of the movable sheave 12b of the primary pulley 12. Also, a hydraulic actuator 19 having a hydraulic chamber 19a is disposed on the front side face of the movable sheave 13b of the secondary pulley 13. A spring 20 that applies a force to the removable sheave 13b is disposed in a state of compression in the hydraulic chamber 19a.

A counter drive gear 21 is secured on a shaft 13c of the secondary pulley 13. A counter driven gear 22 meshing with the drive gear 21 is secured on the countershaft 15. A final drive gear 23 is also secured on the countershaft 15. The differential unit 7 has a final driven (mount ring) gear 26 fixed to its case 25, a differential gear 27 supported by the differential case 25, and left and right side gears 28 that are coupled to left and right axle shafts 29l and 29r, respectively, and that mesh with the differential gear 27. The final driven gear 26 meshes with the final drive gear 23.

Next, a front (engine-side) portion, mounted on the first shaft and including the forward-reverse switching unit 5 and the oil pump 10, will be described in detail with reference to FIG. 2. The oil pump 10 has a pump body 31 fixed to a mission case 30, and a cover 32 fixed to the pump body 31. The pump body 31 and the cover 32 accommodate a gear pump 33 coupled to a pump hub 34 of the torque converter 3. A stator sleeve 35 is integrally fitted to the inner periphery of the oil pump 10 that is integrated with the case 30. The stator sleeve 35 is coupled to the fixed side race (see FIG. 1) of a one-way clutch 36. The input shaft 11 is rotatably supported within the sleeve 35 via a bush 37 or a needle bearing. A clutch drum 39 is integrally coupled to the input shaft 11 by welding. A piston 40 is fitted for axial reciprocation within the clutch drum 39, in an oil-tight manner, to form a hydraulic actuator 41 for the forward clutch C1. A check ball 42 for discharging hydraulic pressure resulting from centrifugal force is disposed on the piston plate 40. A return spring 45 is disposed in a compressed state on the front side face of the piston plate 40 and is held between the piston plate 40 and a retainer 43 fixed to the drum 39.

The simple planetary gear unit 14 of the forward-reverse switching mechanism 5 has a large diameter sun gear S. A boss (portion) 46 that is integrally formed on one end face (on the front side) of the sun gear S is spline-connected to the stationary sheave 12a of the primary pulley 12. A clutch hub 47 is integrally fixed to the other (rear) end face of the sun gear S by welding. A lug 49 that is formed integrally with the ring gear R is integrally coupled to an outer diameter portion 39a of the clutch drum 39 and is spline-connected to the clutch drum 39, while being prevented from axial movement by a snap ring. In addition, a plurality of clutch plates (outer friction plates) 50 and a plurality of clutch discs (inner friction plates) 51 are alternately provided between an inner peripheral face spline on the outer surface portion 39a of the clutch drum 39 and an outer peripheral face spline of the clutch hub 47, to form the forward clutch C1, a wet-type multiple disc clutch.

The carrier CR supporting the pinion P has a carrier cover (one lateral plate) 52 that has a circular shape and is located on the front side. The lateral plate 52 is rotatably supported by the boss 46 of the sun gear via a bush 53. An outer peripheral portion of the lateral plate 52 of the carrier is constructed as a brake hub 52a. A plurality of plates (outer friction plates) 54 and a plurality of discs (inner friction plates) 55 are alternately disposed between the brake hub 52a and a spline on the case 30 to form reverse brake. B2, a wet-type multiple disc brake. The pinion P and the brake hub 52a axially overlap each other.

A rear-side boss portion of the stationary sheave 12a of the primary pulley 12 is rotatably supported on a front lateral face of a partition 30a formed in the case 30 via a roller bearing 56, while fitted within a recess that is formed in partition 30a coaxially with the first shaft. A cylinder 57 is formed as an annular recess in the front face of the partition 30a, radially outward of the roller bearing 56. A piston 58 is fitted in the cylinder 57 in an oil-tight manner for axial reciprocating movement therein and a return spring 60 is disposed in a compressed state between the front lateral face of the piston 58 and a retainer 59 fixed to the case 30 to form a hydraulic actuator 61 for the aforementioned reverse brake.

Hydraulic pressure is supplied to or discharged from the hydraulic actuator 41 for the aforementioned forward clutch via an oil passage 62 formed in the pump body 31. Hydraulic pressure is supplied to or discharged from the hydraulic actuator 61 for the aforementioned reverse brake via an oil passage 63 formed in the partition 30a of the case 30.

The forward clutch C1 does not axially overlap the reverse brake B axially or longitudinally. The reverse brake B is disposed offset radially outward in such a manner as to partially radially overlap the forward clutch C1. In this manner, and further due to the structure of the later-described carrier CR, the forward-reverse switching mechanism 5 is made radially compact.

A lubricating oil passage 65 is axially formed in the input shaft 11, and a plurality of oil holes 66a, 66b, 66c extend therefrom radially through the input shaft 11. Oil is supplied via this structure to various elements requiring: lubrication, for example, thrust bearings 67 and 69 supporting and axially positioning the input shaft 11, the sun gear S, the multiple friction plates of the forward clutch C1 and the reverse brake B, gear faces of the planetary gear unit 14, needle bearings 75 via which the pinion P is supported on a pinion shaft 72, a thrust washer 76 disposed between the pinion P and the lateral plate 52, and a thrust washer 76 disposed between the pinion P and a lateral plate 74. An oil sump 70 is formed as an annular recess groove in the interior surface of the boss 46 of the sun gear S. Oil that has been supplied from the radially inward side, namely, from the oil hole 66c of the input shaft 11, is stored in the oil sump 70. An oil hole 68 extends from the bottom of the oil sump 70 to an outer peripheral face of the boss 46.

For lubricating of components which rotate when the vehicle is towed, an oil passage 80 is formed in the pump case body 31 of the oil pump 10 in such a manner as to extend substantially vertically to a central portion thereof. As disclosed in Japanese Patent Laid-Open Publication No. 2001-12586 and Japanese Patent Application No. 2002-349252 (not laid open when the present application was filed), for example, the oil passage 80 for lubrication during towing is designed such that a gear located at a lowest position, such as the final driven gear (differential mount ring gear) 26 or the like, stirs oil in the mission case 30 and introduces it into an oil sump provided in the pump case body 31 or the like so as to supply this oil from the oil sump by gravity. The oil passage 80 communicates with an oil passage 81 that is formed as a groove in an inner peripheral surface of the case body 31 and an outer peripheral surface of a sleeve shaft 84. In addition, the oil passage 80 communicates with the lubricating oil passage 65 via a throughhole 82 formed in the sleeve shaft 84, a space between the input shaft 11 and the sleeve shaft 84, and an oil passage 85 formed in the input shaft 11.

A space 86 is formed between the radially inward portion 39b of the clutch drum 39 and an extended end portion of the oil case body 31. An oil hole 87 is formed in the radially inward portion 39b of the clutch drum 39, so that oil in the space 86 lubricates the outside of the drum 39. The oil hole 87 is arranged such that oil flowing therefrom is received by the sun gear S and the clutch hub 47 that are integrated with each other.

A recess 90 is formed in the rear lateral face of the sun gear S. An annular flange portion 91 protrudes axially forward from the outer periphery of the sun gear S. A radially outer side of the clutch hub 47 is integrally attached to the distal end of the flange portion 91 by welding or the like and is splined at surface portion 47a to hold the friction plates 51. The radially inward side of the clutch hub 47 forms a gate portion 95 that extends diagonally and radially inward to store oil in cooperation with the recess 90, and to limit overflow of oil from oil sump 92.

First oil passages 96 and second oil passages 97 are formed in the recess 90. The first oil passages 96 penetrate the flange portion 91 radially and extend to the outer peripheral surface. The second oil passages 97 diagonally penetrate the sun gear S radially outward and extend to the other side. The first oil passages 96 and the second oil passages 97 are circumferentially equidistantly arranged, are equal in number (e.g., two), and have the same diameter. Openings in the oil sump 92 are located on the same radius, thus constituting left and right orifices to which an equal amount of oil is supplied simultaneously. If a hydraulic pressure resulting from a centrifugal force is applied to oil stored in the oil sump 92, the oil flows out through the oil passages 96 and 97. However, if no centrifugal force is applied to oil in the oil sump 92 so that the oil is subject only to static pressure, the oil does not flow out due to its viscosity. Thus, the amount of the oil leaking out is prevented from exceeding a preset small amount.

The carrier CR of the planetary gear 14 will be described in detail with reference to FIGS. 3 and 4. The carrier CR has the carrier cover (lateral plate) 52 on one side and the carrier body (lateral plate) 74 on the other side. The lateral plates 52 and 74 are both made of a sintered alloy. The carrier body is an annular member whose radial dimension is relatively small. Bridges 100 formed integrally with the carrier body 74 are fitted into fitting holes 101 of the carrier cover 52 and then are sintered, whereby the carrier body (lateral plate) 74, the carrier cover (lateral plate) 52, and the bush 53 are formed into a single integral component. The lateral plates (the cover and the body) 52 and 74 are arranged parallel to each other and spaced from each other by a distance m which allows the pinion P and the thrust washer 76 to be interposed between the lateral plates 52 and 74.

The carrier cover (one lateral plate) 52 is in the shape of a circular plate having a thick central portion 52b. The brake hub 52a is formed integrally with the carrier cover 52, extending axially rearward from the outer periphery of plate 52. A cylindrical hole 103, which is a circular through-hole when viewed in an axial direction, is formed in the central portion 52b and in a central portion of a flange portion 102. The bush 53 is fitted within through the cylindrical hole 103 for slidable contact with the outer cylindrical surface of the boss 46 of the sun gear S, whereby the carrier cover 52 is rotatably supported on boss 46 while interposed between the stationary sheave 12a of the primary pulley, 12 and the sun gear. S.

Figure 2:
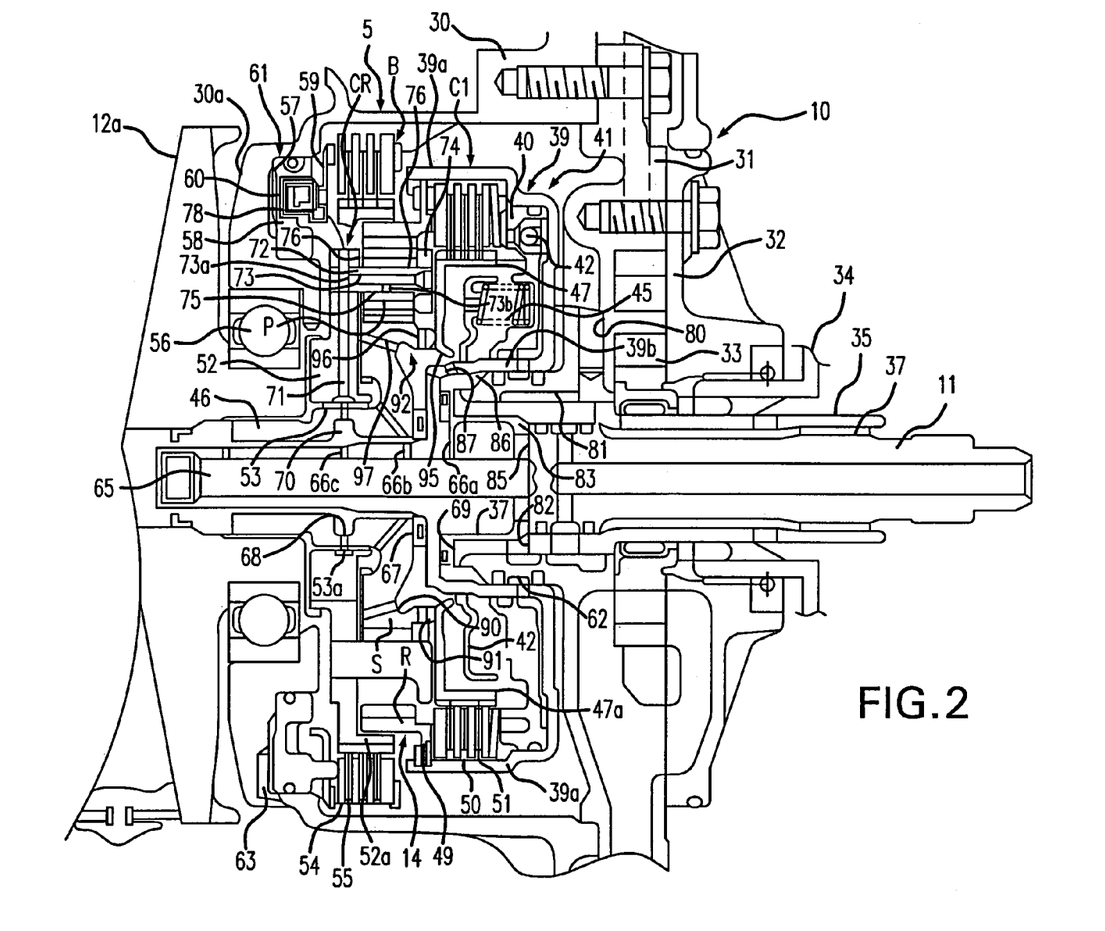
FIG. 2 is a cross-sectional view of a forward-reverse switching mechanism of the continuously variable automatic transmission.
Figure 3:
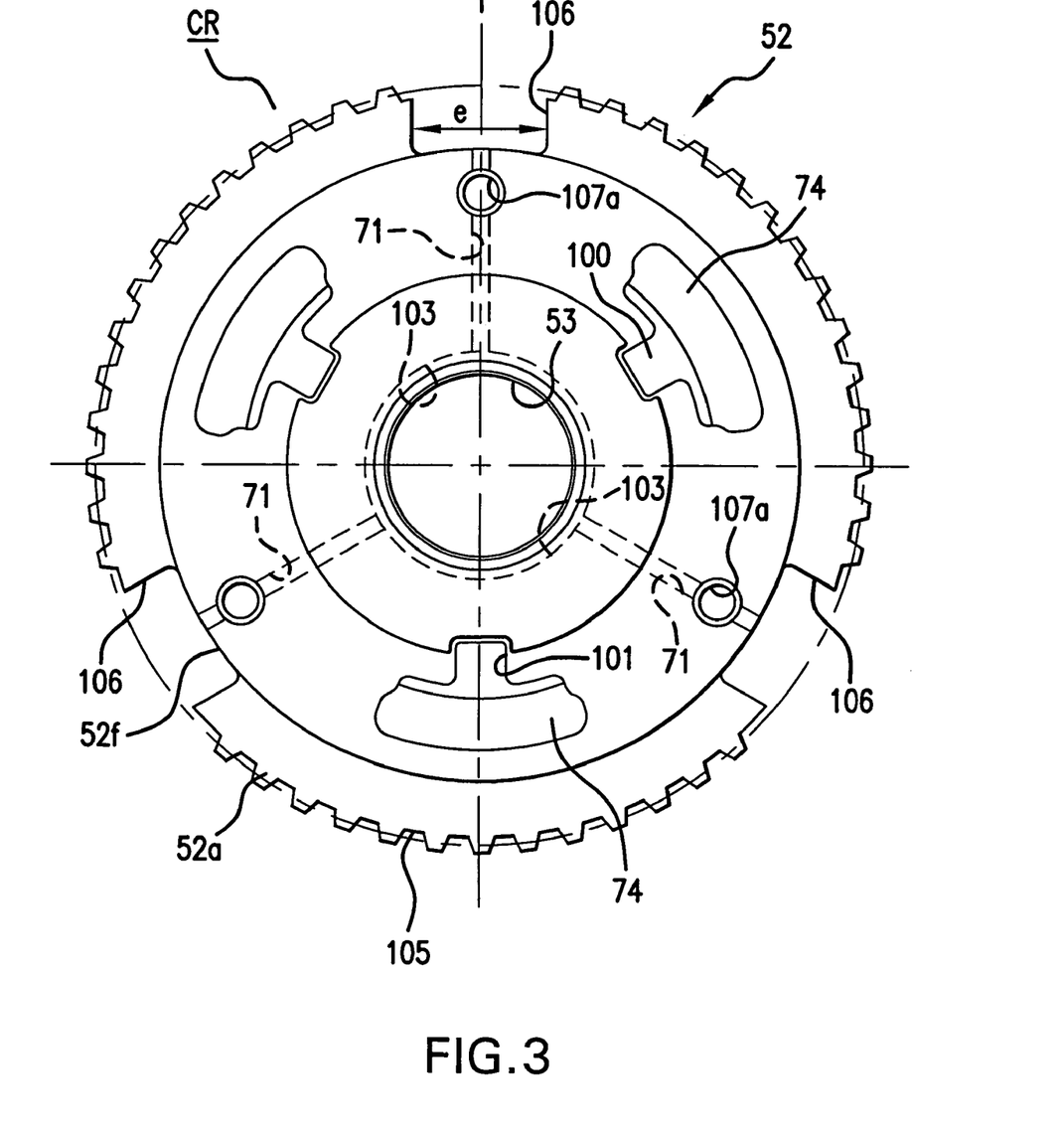
FIG. 3 is an enlarged front view of a carrier of a planetary gear unit constituting an essential part of the present invention.
Figure 4:
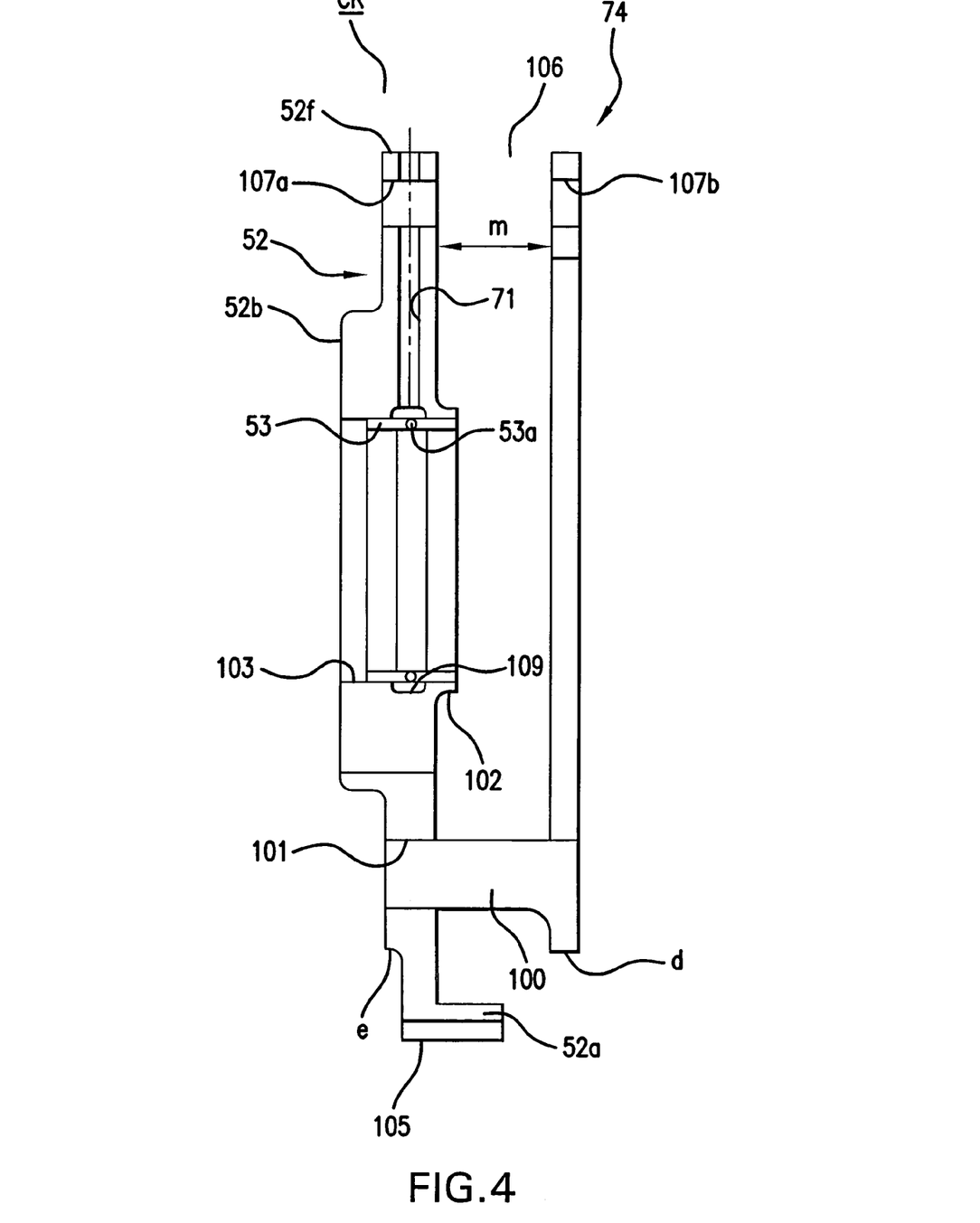
FIG. 4 is a lateral cross-sectional view of the carrier of FIG. 3.

A spline 105 for engaging the brake discs (inner friction plates) 55 is formed on the outer peripheral surface of the brake hub 52a as shown in FIGS. 3 and 4. Notches 106 are formed at predetermined intervals, e.g., at three locations arranged at intervals of angle of 120° around the rotational axis of the carrier cover 52. The notches 106 have a circumferential length (a precise linear distance) "e" that is longer than the diameter of the pinion P (FIG. 2). The notches 106 allow the pinion P to be inserted into or removed from the space between the carrier cover 52 and the carrier body 74. The notches 106 are cut substantially radially aligned with an outer peripheral face "d" of the carrier body 74 and an outer peripheral face "e" of the thick central portion 52b of the carrier cover 52. Outer peripheral faces 52f of the carrier cover 52 where the notches 106 are located (notch bottoms) are formed as smooth surfaces. Lubricating oil holes 71 radially extending from the inner peripheral surface defining the cylindrical hole 103 are formed in the carrier cover 52. The lubricating oil holes 71 penetrate the carrier cover 52 radially outwardly from the inner peripheral surface. An extension "f" of a centerline of each of the lubricating oil holes 71 is so set as to be located within the width "e" of a corresponding one of the notches 106, preferably, at the center of the width "e". An oil hole 53a is formed in substantially the center of the axial dimension of the bush 53. Each oil hole 53a is positioned so as to communicate with a lubricating oil hole 71.

Support holes 107a and 107b for receiving the pinion shaft (support shaft) 72 are coaxially formed in the carrier cover 52 and the carrier body 74, respectively. The pinion shaft 72 (FIG. 2) is inserted through the support holes 107a and 107b and supported thereby. Each of the support holes 107a of the carrier cover 52 is radially aligned with the center of width e of a corresponding one of the notches 106. Accordingly, each of the lubricating oil holes 71 intersects with and penetrates a corresponding one of the support holes 107a.

Next, assembly of the carrier CR will be described. Each of the carrier cover (one lateral plate) 52 and the carrier body (the other lateral plate) 74 is integrally formed by sintering or the like. The three bridges 100 that are formed so as to protrude axially from the carrier body 74 are fitted into respective fitting holes 101 of the carrier cover 52 and sintered (vitrified), whereby the carrier cover 52 and the carrier body 74 are integrated into a single, unitary (integral) component.

Holes are drilled from the centers of the three notch portions 106 to the surface surrounding the cylindrical hole 103, whereby the lubricating oil holes 71 are formed in the cover 52 of the integrally formed carrier. An annular recess groove 109 is formed around the circumference of the cylindrical surface defining the cylindrical hole 103 and the lubricating oil holes 71 communicate with the recess groove 109. The bush 53 is fitted into the cylindrical hole 103, and the oil hole 53a is positioned and fixed in such a manner as to communicate with the recess groove 109. The outer peripheral face 52f of the carrier cover 52, wherein the notches 106 are located, is formed as a smooth surface. Therefore, as in the case of a like element without notches, there is no need to form spot facings for drilling or the like on the brake hub 52a. Thus, the man-hours required for machining can be reduced.

As noted above, the carrier body 74 and the carrier cover 52 (the "lateral plates") are spaced apart from each other by the predetermined distance "m", are disposed parallel to each other, and are integrated with each other by the bridges 100. The brake hub 52a is formed as the outer peripheral surface of the carrier cover 52. Where the clutch hub segments are located, the pinion P cannot be easily inserted into the space m. However, according to the present invention, since the notches 106 are larger in diameter than the pinions P, the pinions P can be inserted through the notches 106 into the space (m) between the carrier cover 52 and the cover body 74. As inserted, needle bearings 75 are held on the inner peripheral face of the pinion P by means of a jig.

At the same time, the front and rear thrust washers 76 and 76 (FIG. 2) are also inserted into the space (m). The pinions P are positioned and held coaxially within the support holes 107a and 107b.

As shown in FIG. 2, an axially extending longitudinal oil hole 73 is formed in the pinion support shaft (pinion shaft) 72 with the opening at the rear end (on the side of the carrier body) plugged. A radial through-hole 73a is formed in a front side end of pinion shaft 72 to provide communication between the longitudinal oil hole 73 in the pinion shaft 72 and oil passage 71. A lateral oil hole 73b for lubrication of the needle bearing 75 extends radially through pinion shaft 72 from an intermediate portion of the longitudinal oil hole 73.

The pinion support shaft 72 is inserted from the side of the carrier cover 52 into and through the pinion P, the needle bearings 75, and the thrust washers 76 and 76, which are held between the carrier cover 52 and the carrier body 74. In this manner, the pinion support shafts 72 are fitted into respective support holes 107a of the carrier cover 52 and each of the support holes 107b of the carrier body 74, whereby the pinions are mounted between the carrier cover 52 and the carrier body 74. In addition, pins 78 (FIG. 2) are inserted from the notches 106 of the hub into the outer ends of the lubricating oil holes 71 to close the outer ends of the lubricating oil holes 71. Each pin 78 is introduced along a lubricating oil hole 71 and into a through-hole 73a of the support shaft. The pinion support shaft 72 is positioned so that the through-holes 73a communicate with the lubricating oil holes 71. Thus, the pinion support shafts 72 are supported while prevented from sliding out of the carrier cover 52.

The bush 53 on the inner peripheral surface of the carrier cover 52 is fitted on the boss 46 of the sun gear S so as to form a subassembly and the stationary sheave 12a of the primary pulley 12 is spline-fitted on the boss 46. In this assembly, the oil hole 68 extending from the oil sump 70 of the boss 46 of the sun gear S is positioned so as to be axially aligned with the oil hole 53a of the bush 53.

Next, operation of the continuously variable automatic transmission 1 will be described with reference to FIGS. 1 and 2. During normal driving in which power is transmitted to the wheels from a drive source such as an engine or the like, rotation of the engine output shaft 9 is transmitted to the input shaft 11 via the torque converter 3. If the shift lever is in the D range, a hydraulic pressure is supplied to the hydraulic actuator 41 so that the forward clutch C1 is connected, and oil is drained from the hydraulic actuator 61 so that the reverse brake B is released. The clutch drum 39 and the forward clutch C1 transmit rotation of the input shaft 11 to the primary pulley 12 as integral rotation via the planetary gear unit 14 that is in a state of integral rotation.

If the shift lever is moved to the position for the R (reverse) range, oil is drained from the hydraulic actuator 41 so that the forward clutch C1 is released, and a hydraulic pressure is supplied to the hydraulic actuator 61 so that the reverse brake B is engaged. In this state, since the carrier CR is stopped by the brake B, rotation of the input shaft 5 is transmitted from the ring gear R for decelerating reverse rotation of the sun gear S via the pinion P of the carrier CR which is stopped from rotating. This reverse rotation is transmitted to the primary pulley 12.

Speed of rotation of the primary pulley 12 is suitably changed by the belt-type continuously variable speed-change unit (CVT) 6 and is transmitted to the secondary pulley 13. Furthermore, rotation of the secondary pulley 13 is transmitted to the countershaft 15 via the counter drive gear 21 and the counter driven gear 22, is transmitted to the differential unit 7 via the final drive gear 23 and the driven (mount ring) gear 26, and is transmitted to the front-left and front-right wheels via the left and right differential output shafts 29l and 29r, respectively.

During normal driving, rotation of the engine output shaft 9 is transmitted to a drive gear 110 of the oil pump 10 via the pump hub 34 and a pump shell 6a of the torque converter 3. Thus, oil in the case 30 and oil pan 111 is taken up by the oil pump 10, and is suitably delivered to or discharged from the hydraulic actuators 17 and 19 (FIG. 1) and 39 and 61 (FIG. 2) via respective valves of a valve body. Further, oil flowing from the oil pump 21 is conveyed to portions requiring lubrication, i.e., 14, C1, B, 67 and 69, via the oil passages 65 and 66 to forcibly lubricate those portions.

More specifically, lubricating oil from the oil passage 65 of the input shaft 11 is passed through the radially internal portion 39b of the clutch drum 39 via the oil hole 66a, through the thrust bearing 69, into the space 86 and through the oil hole 87, and is supplied to the oil sump 92. Lubricating oil is also supplied to the oil sump 92 (recess portion 90 of the sun gear S) via the oil hole 66b and the thrust bearing 67.

Lubricating oil in the oil passage 65 of the input shaft 11 lubricates the bush 53 via the oil hole 66c and the oil sump 70. The lubricating oil is then supplied to pinion support surfaces such as the needle bearings 75, the thrust washer 76 and the like, the interface between the pinion P and the sun gear S, and a meshing face between the pinion P and the ring gear R via the oil hole 53a of the bush 53, the lubricating oil hole 71 of the carrier cover 52, and the oil holes 73, 73a and 73b of the pinion support shaft 72, whereby the planetary gear unit 14 is lubricated.

The oil that has lubricated the planetary gear unit 14 is introduced to the inner peripheral surface of the brake hub 52a by centrifugal force especially from the front side (on the left side in FIG. 2) of the thrust washer 76. The oil is then supplied through the notches 106 of the brake hub 52a to the brake plates (the friction plates), 54 and the brake discs (the friction plates) 55, and thereby lubricates the friction plates of the reverse brake B.

If the shift lever is in the D range position, the forward clutch C1 is connected, and the sun gear S and the ring gear R are engaged with each other, so that the planetary gear unit 14 rotates integrally. Therefore, the amount of lubricating oil required for the planetary gear 14 and the forward clutch C1 is not very large. In D range, the sun gear S rotates integrally with the input shaft 11 and the primary pulley 12 at a relatively high speed. Rotation of the sun gear S applies centrifugal force to oil in the oil sump 92. The oil exits through the first and second oil passages 96 and 97 due to a hydraulic pressure resulting from the centrifugal force, and lubricates the front and rear (left and right in FIG. 2) thrust washers 76 and 76. The amount of oil lubricating the front thrust washer 76 is substantially equal to the amount of oil lubricating the rear thrust washer 76.

The sun gear S and the carrier CR rotate integrally to apply a centrifugal force to oil flowing from the oil hole 66c. The oil is supplied to the pinion support surfaces via the oil sump 70, the lubricating oil holes 71, and the like.

If the shift lever is in the R range position, the forward clutch C1 is released so that the sun gear S and the ring gear R are disengaged from each other, and the reverse brake B is engaged to stop the carrier CR. Thus, rotation of the ring gear R, which is transmitted from the input shaft 11 via the clutch drum 39, is transmitted to the sun gear S as decelerated reverse rotation via the single pinion P of the stopped carrier CR. Thus, since the gears S, R and P rotate relative to one another, the planetary gear unit 14 needs a relatively large amount of lubricating oil. Rotation of the sun gear S applies centrifugal force to oil in the oil sump 92. As in the case of the aforementioned D range, the oil is introduced to the left and right thrust washers 76 and 76 and interfaces the gears S, R, and P via the first and second oil passages 96 and 97. As a result, the planetary gear unit 14 is lubricated with a sufficient amount of oil.

Because the carrier CR is stopped, no centrifugal force is generated to urge oil through the lubricating oil holes 71 formed in the carrier cover 52. However, the rotation of the sun gear S applies a centrifugal force to the oil sump 70. The hydraulic pressure resulting from the centrifugal force causes oil to flow through the oil hole 66c as a reliable supply to the pinion support surfaces via oil hole 53a, the lubricating oil holes 71, and the oil holes 73 and 73a of the support shaft 72.

If a vehicle is stopped in the D range, for example, at a vehicle speed of 0 with the brake and accelerator ON and OFF, respectively, the forward clutch C1 is about to be engaged. That is, the vehicle does not take off but is ready to take off in response to a take-off signal and the vehicle is in the so-called neutral (N) control state. In this state, the forward clutch C1 is not engaged while the reverse brake B is released. Thus, no power is transmitted to the planetary gear unit 14, and the sun gear S is stopped because the primary pulley 12 is stopped as a result of the vehicle being stopped.

In this state, lubricating oil flowing from the oil passages 87 and 66b accumulates in a lower portion of the oil sump 92 of the stopped sun gear S and no centrifugal force is applied to oil in the oil sump 92. The viscosity of the oil tends to prevent it from passing through the first and second oil passages 96 and 97 and, even if some oil passes therethrough due to gravity the amount is very small. This oil accumulates in the lower portion of the oil sump 92. Oil in the oil sump 92 exits at the flange portion 95 of the clutch hub 47 and substantially the entire amount thereof is supplied to the forward clutch C1 via an oil hole in the engaging portion, of the clutch hub 47. That is, during the N control, the planetary gear unit 14 does not require lubricating oil because no power is transmitted thereto, and the forward clutch C1 requires a large amount of lubricating oil because the clutch plates 50 and the clutch discs 51 are about to be engaged with slip. In order to supply the amount of oil required for lubrication, substantially the entire flow of oil from the oil sump 92 is supplied to the forward clutch C1 and, as a result, the forward clutch C1 is lubricated with a sufficient amount of lubricating oil.

Because the sun gear S and the carrier CR are stopped, no centrifugal force urges oil to flow through the oil passage 66c. However, driven by a hydraulic pressure developed in the oil pump 10, the oil is supplied to the pinion support surfaces through the oil sump 70 and the lubricating oil holes 71. In this state, since the planetary gear unit 14 is stopped and the reverse brake B is released, a large amount of lubricating oil is not required and even without application of a centrifugal force, there is no deficiency in oil lubrication.

The foregoing description refers to N control. However, the same holds true even if the vehicle is stopped with the shift lever in the N range position. Substantially the entire flow of oil from the oil sump 92 is supplied to the forward clutch C1. In preparation for the start of engagement of the forward clutch C1, responsive to moving the shift lever from the N range to the D range, it is preferable that a sufficient amount of lubricating oil be supplied to the forward clutch C1.

A "towed state" in which the vehicle is towed by another vehicle or the like because of a malfunction or the like will now be described. In the vehicle, the engine is stopped, and the oil (gear) pump 10 driven by the engine is stopped. Thus, the oil pump generates no hydraulic fluid pressure and no lubricating oil pressure. Accordingly, the forward clutch C1 and the reverse brake B operated by the hydraulic actuator are both released. The belt-type continuously variable speed-change unit 6 assumes an ultimate under-drive state wherein the return spring 20 or the like makes the primary pulley 12 and the secondary pulley 25 assume a minimum effective radius and a maximum effective radius, respectively. Furthermore, the aforementioned elements requiring lubrication receive none of the aforementioned forced lubrication.

When the vehicle is towed, the input shaft 11 and the ring gear R are stopped because the forward clutch C1 is released. However, since the front wheels rotate, the differential unit 7, the final driven (differential ring) gear 26, a drive pinion gear 23, the counter driven gear 22, the counter drive gear 21, and the belt-type continuously variable speed-change unit 6 are in states of rotation. Also, because of reverse driving by the wheels, the belt-type continuously variable speed-change unit 6 assuming the aforementioned under-drive state is shifted to the ultimate over-drive state. As a result, the primary pulley 12 and the sun gear S integrated therewith rotate at a relatively high speed.

When the vehicle is towed, since the differential ring gear 26 rotates and thereby stirs oil accumulated in the lower portion of the mission case 30. This oil is passed on to the other gears 23, 22, 29 and the like, and is introduced into the oil sump formed in the pump case body 31. Gravity causes the oil in the oil sump to flow to the oil passage 65 of the input shaft 11 through the oil passages 80 and 81, through space 83, and through the oil passage 85. The oil is then introduced into the space 86 in the stopped clutch drum 39 via the oil hole 66a and the thrust bearing 69. In addition, oil from the space 86 and oil flowing from the oil passage 66b are supplied to the oil sump 92 via the oil passage 87. As described above, when the vehicle is towed, the sun gear S rotates at a relatively high speed, and because of the centrifugal force thereby generated, substantially the entire amount of oil in the oil sump 92 is supplied to the interface between the planetary gear unit 14 and the thrust washer 76 via the first and second oil passages 96 and 97.

Oil flowing from the oil passage 66c of the input shaft 11 is introduced into the oil sump 70 formed in the inner peripheral face of the sun gear S. When the vehicle is towed, the sun gear S rotates and thereby applies a centrifugal force to the oil in the oil sump 70. Because of a hydraulic pressure resulting from the centrifugal force, the oil is supplied to an oil hole 31a of the bush and the three radially-extending lubricating oil holes 71. In addition, since the carrier CR also rotates due to stoppage of the ring gear R, the oil is further urged by centrifugal force through the lubricating oil holes 71 and the oil holes 73 and 73a of the pinion support shaft to lubricate the pinion support surfaces. Also, this oil is supplied from the notches 106 of the hub to lubricate the reverse brake B.

Thus, when the vehicle is towed, a small amount of lubricating oil is transported by rotation of the sun gear S and idling states of the ring gear R and the carrier CR.

Though small in amount, most of that oil is supplied to and reliably lubricates the rotating components of the planetary gear unit 14.

The aforementioned embodiment has been described as applied to a forward-reverse switching unit of the continuously variable automatic transmission. However, the present invention is also applicable to a planetary gear unit of a vehicular transmission such as a multiple stage automatic transmission.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A planetary gear unit for an automatic transmission, comprising:
    a sun gear;
    a ring gear; and
    a carrier which supports a pinion and with which a hub for a frictional engagement element is integrated and which is located on a radially outer side of the ring gear, wherein
    the carrier has one lateral plate and another lateral plate, both of said lateral plates supporting the pinion;
    wherein the hub is formed integrally with the one lateral plate and axially overlaps the pinion, and at least one notch, having a circumferential length equal to or longer than a diameter of the pinion, is formed in an outer periphery of the hub; and
    wherein a lubricating oil hole penetrates the one lateral plate radially inward from the notch.

2. The planetary gear unit according to claim 1, wherein segments of an outer peripheral surface of the one lateral plate, between plural notches, are formed as smooth surfaces.

3. The planetary gear unit according to claim 1, further comprising:
    a support shaft for the pinion extending between the lateral plates, said lateral plates being axially spaced;
    a longitudinal oil hole that extends axially through the support shaft;
    a lateral oil hole in the support shaft which establishes communication between the longitudinal oil hole and an outer peripheral face supporting the pinion; and
    a through-hole that extends radially through the support shaft at one end for supplying oil from the lubricating oil hole in the one lateral plate to the longitudinal oil hole, the support shaft being fixed to the one lateral plate at a position where the through-hole communicates with the lubricating oil hole.

4. The planetary gear unit according to claim 3, further comprising:
    a pin inserted into the through-hole from a radially outer end of the lubricating oil hole and extending entirely through the through-hole, the support shaft being fixed to the one lateral plate by the pin, and the lubricating oil hole being plugged by the pin.

5. The planetary gear unit according to claim 4, wherein the sun gear has an axially extending boss portion and further comprising:
    an oil sump formed in an inner peripheral face of the boss portion of the sun gear;
    an oil hole extending through the boss portion, from the oil sump to an outer peripheral face of the boss portion, the one lateral plate being rotatably supported on the outer peripheral face of the boss portion at a position where the oil hole is radially aligned with the lubricating oil hole.

6. The planetary gear unit according to claim 5, in the form of a simple planetary gear unit constituting a forward-reverse switching unit for a continuously variable automatic transmission, wherein an input shaft is coupled to the ring gear and the sun gear is coupled to a primary pulley, said planetary gear unit further comprising:
    a forward clutch interposed between the sun gear and the ring gear; and
    a frictional engagement element serving as a reverse brake for selectively stopping the carrier.

7. The planetary gear unit according to claim 6, wherein the forward clutch includes a clutch drum that couples the input shaft to the ring gear, a clutch hub integral with the sun gear, and multiple friction plates interposed between the clutch drum and the clutch hub,
    the reverse brake includes multiple friction plates interposed between a hub extending axially from the one lateral plate and a case housing the planetary gear unit, and
    the forward clutch and the reverse brake radially overlap.

8. The planetary gear unit according to claim 3, wherein the sun gear has an axially extending boss portion and further comprising:
    an oil sump formed in an inner peripheral face of the boss portion of the sun gear;
    an oil hole extending through the boss portion, from the oil sump to an outer peripheral face of the boss portion, the one lateral plate being rotatably supported on the outer peripheral face of the boss portion at a position where the oil hole is radially aligned with the lubricating oil hole.

9. The planetary gear unit according to claim 8, in the form of a simple planetary gear unit constituting a forward-reverse switching unit for a continuously variable automatic transmission, wherein an input shaft is coupled to the ring gear and the sun gear is coupled to a primary pulley, said planetary gear unit further comprising:
    a forward clutch interposed between the sun gear and the ring gear; and
    a frictional engagement element serving as a reverse brake for selectively stopping the carrier.

10. The planetary gear unit according to claim 9, wherein the forward clutch includes a clutch drum that couples the input shaft to the ring gear, a clutch hub integral with the sun gear, and multiple friction plates interposed between the clutch drum and the clutch hub,
    the reverse brake includes multiple friction plates interposed between a hub extending axially from the one lateral plate and a case housing the planetary gear unit, and
    the forward clutch and the reverse brake radially overlap.

11. The planetary gear unit according to claim 1, wherein the sun gear has an axially extending boss portion and further comprising:
    an oil sump formed in an inner peripheral face of the boss portion of the sun gear;
    an oil hole extending through the boss portion, from the oil sump to an outer peripheral face of the boss portion, the one lateral plate being rotatably supported on the outer peripheral face of the boss portion at a position where the oil hole is radially aligned with the lubricating oil hole.

12. The planetary gear unit according to claim 11, in the form of a simple planetary gear unit constituting a forward-reverse switching unit for a continuously variable automatic transmission, wherein an input shaft is coupled to the ring gear and the sun gear is coupled to a primary pulley, said planetary gear unit further comprising:
- a forward clutch interposed between the sun gear and the ring gear; and
- a frictional engagement element serving as a reverse brake for selectively stopping the carrier.

13. The planetary gear unit according to claim 12, wherein
the forward clutch includes a clutch drum that couples the input shaft to the ring gear, a clutch hub integral with the sun gear, and multiple friction plates interposed between the clutch drum and the clutch hub,
the reverse brake includes multiple friction plates interposed between a hub extending axially from the one lateral plate and a case housing the planetary gear unit, and
the forward clutch and the reverse brake radially overlap.

14. The planetary gear unit according to claim 1, in the form of a simple planetary gear unit constituting a forward-reverse switching unit for a continuously variable automatic transmission, wherein an input shaft is coupled to the ring gear and the sun gear is coupled to a primary pulley, said planetary gear unit further comprising:
- a forward clutch interposed between the sun gear and the ring gear; and
- a frictional engagement element serving as a reverse brake for selectively stopping the carrier.

15. The planetary gear unit according to claim 14, wherein
the forward clutch includes a clutch drum that couples the input shaft to the ring gear, a clutch hub integral with the sun gear, and multiple friction plates interposed between the clutch drum and the clutch hub,
the reverse brake includes multiple friction plates interposed between a hub extending axially from the one lateral plate and a case housing the planetary gear unit, and
the forward clutch and the reverse brake radially overlap.

16. A continuously variable automatic transmission comprising:
- a primary pulley;
- a secondary pulley;
- a belt through which the primary pulley drives the secondary pulley;
- a forward-reverse switching unit comprising:
  - a sun gear coupled to the primary pulley;
  - a ring gear;
  - a carrier which supports a pinion and with which a hub for a frictional engagement element is integrated and which is located on a radially outer side of the ring gear, wherein:
    the carrier has one lateral plate and another lateral plate, both of said lateral plates supporting the pinion;
    the hub is formed integrally with the one lateral plate and axially overlaps the pinion, and at least one notch, having a circumferential length equal to or longer than a diameter of the pinion, is formed in an outer periphery of the hub;
- an input shaft is coupled to the ring gear;
- a forward clutch is interposed between the sun gear and the ring gear;
- a reverse brake for selectively stops the carrier; and
- a lubricating oil hole penetrates the one lateral plate radially inward from the notch.

17. The continuously variable automatic transmission according to claim 16, further comprising:
- a support shaft for the pinion extending between the lateral plates, said lateral plates being axially spaced;
- a longitudinal oil hole that extends axially through the support shaft;
- a lateral oil hole in the support shaft which establishes communication between the longitudinal oil hole and an outer peripheral face supporting the pinion; and
- a through-hole that extends radially through the support shaft at one end for supplying oil from the lubricating oil hole in the one lateral plate to the longitudinal oil hole, the support shaft being fixed to the one lateral plate at a position where the through-hole communicates with the lubricating oil hole.

18. The continuously variable automatic transmission according to claim 17, further comprising:
- a pin inserted into the through-hole from a radially outer end of the lubricating oil hole and extending entirely through the through-hole, the support shaft being fixed to the one lateral plate by the pin, and the lubricating oil hole being plugged by the pin.

19. The continuously variable automatic transmission according to claim 18, wherein the sun gear has an axially extending boss portion and further comprising:
- an oil sump formed in an inner peripheral face of the boss portion of the sun gear;
- an oil hole extending through the boss portion, from the oil sump to an outer peripheral face of the boss portion, the one lateral plate being rotatably supported on the outer peripheral face of the boss portion at a position where the oil hole is radially aligned with the lubricating oil hole.

20. A planetary gear unit for an automatic transmission, comprising:
- a sun gear;
- a ring gear; and
- a carrier which supports a pinion and with which a hub for a frictional engagement element is integrated and which is located on a radially outer side of the ring gear, wherein:
the carrier has one lateral plate and another lateral plate, both of said lateral plates supporting the pinion;
a support shaft for the pinion extends between the lateral plates, said lateral plates being axially spaced;
a longitudinal oil hole extends axially through the support shaft;
a lateral oil hole in the support shaft establishes communication between the longitudinal oil hole and an outer peripheral face supporting the pinion; and
a through-hole extends radially through the support shaft at one end for supplying oil from the lubricating oil hole in the one lateral plate to the longitudinal oil hole, the support shaft being fixed to the one lateral plate at a position where the through-hole communicates with the lubricating oil hole; and
wherein the hub is formed integrally with the one lateral plate and axially overlaps the pinion, and at least one notch, having a circumferential length equal to or longer than a diameter of the pinion, is formed in an outer periphery of the hub; and
wherein a lubricating oil hole penetrates the one lateral plate radially inward from the notch.

21. The planetary gear unit according to claim 20, further comprising:
- a pin inserted into the through-hole from a radially outer end of the lubricating oil hole and extending entirely through the through-hole, the support shaft being fixed to the one lateral plate by the pin, and the lubricating oil hole being plugged by the pin.

* * * * *

UNITED STATES PATENT AND TRADEMARK OFFICE
CERTIFICATE OF CORRECTION

PATENT NO. : 7,025,704 B2  Page 1 of 1
APPLICATION NO. : 10/712253
DATED : April 11, 2006
INVENTOR(S) : Takashi Yasuda et al.

It is certified that error appears in the above-identified patent and that said Letters Patent is hereby corrected as shown below:

Column 15, line 59, "brake for selectively" should read -- brake selectively --.

Signed and Sealed this

Eleventh Day of July, 2006

JON W. DUDAS
*Director of the United States Patent and Trademark Office*